June 13, 1950 W. T. STEPHENS 2,511,518
FLUID SHAFT COUPLING
Filed Nov. 28, 1945 2 Sheets-Sheet 1
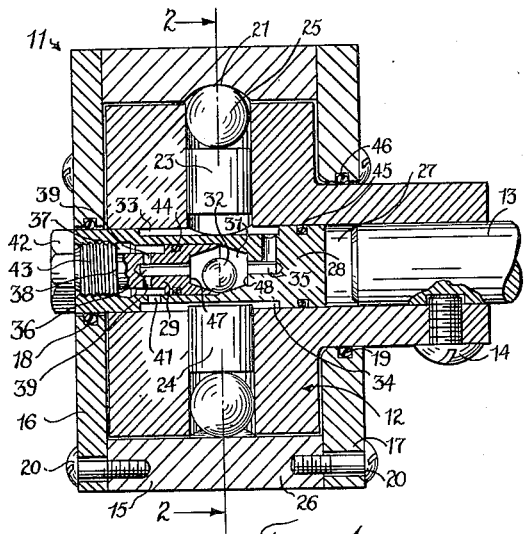
Fig. 1
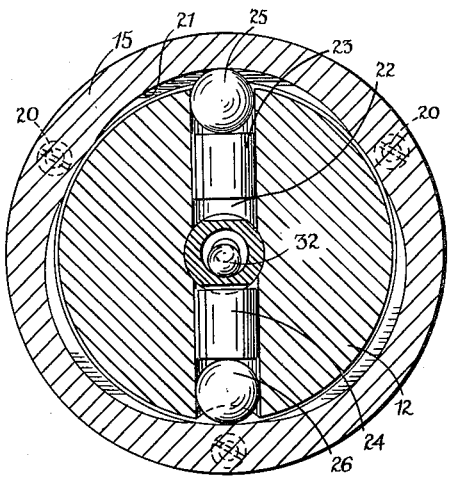
Fig. 2
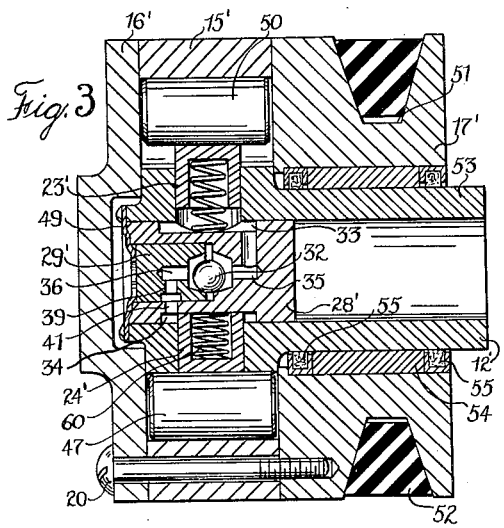
Fig. 3
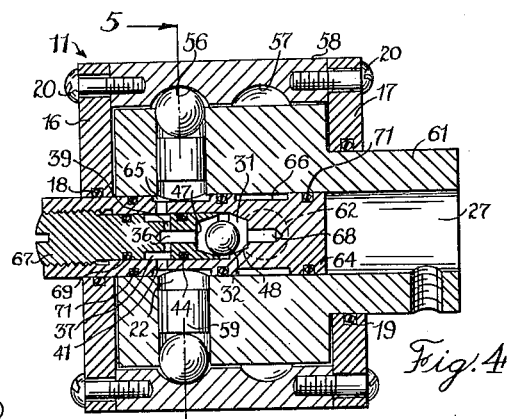
Fig. 4
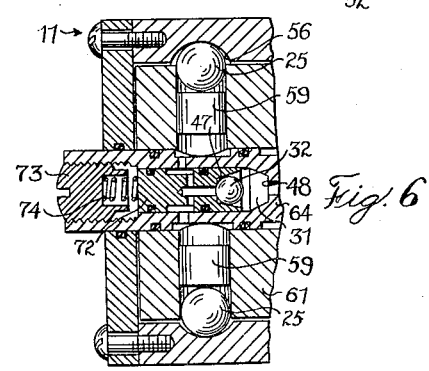
Fig. 6
Fig. 5
INVENTOR.
WILLIAM T. STEPHENS
BY Frederic B. Schramm
ATTORNEYS June 13, 1950 W. T. STEPHENS 2,511,518
FLUID SHAFT COUPLING
Filed Nov. 28, 1945 2 Sheets-Sheet 2
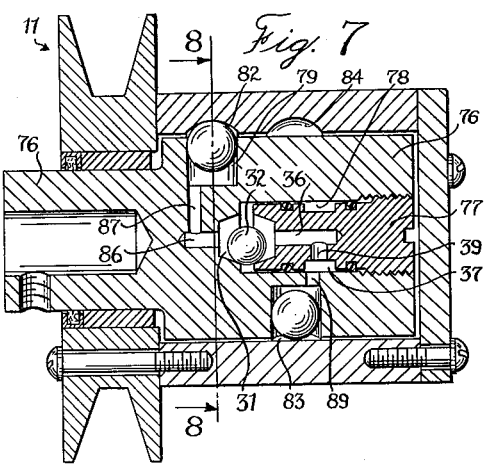
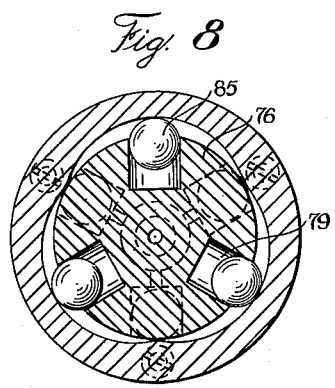
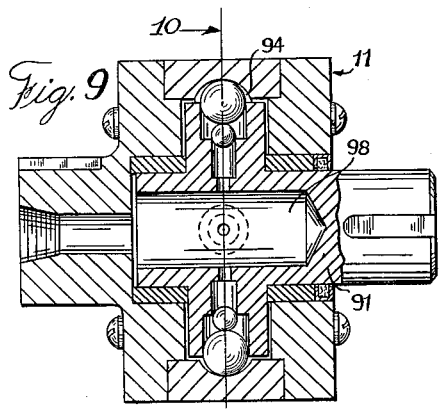
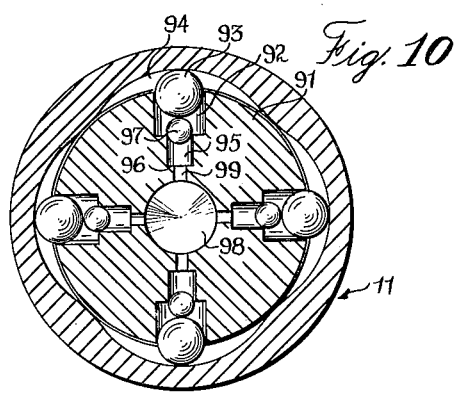
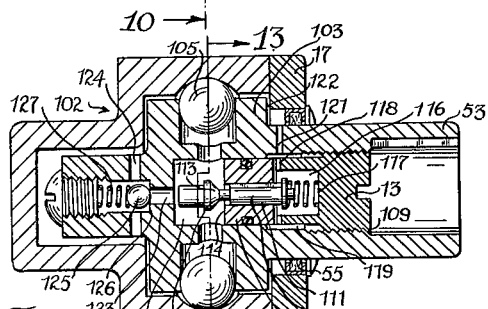
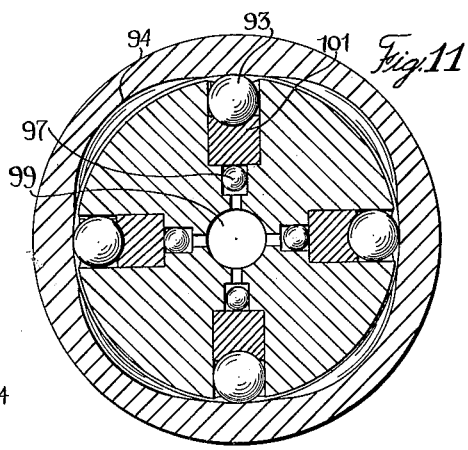
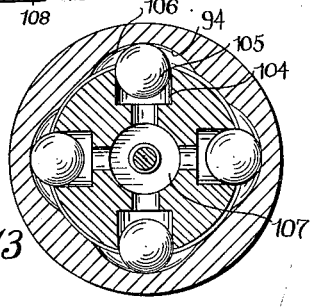
INVENTOR.
WILLIAM T. STEPHENS
BY Frederic B. Schramm
ATTORNEYS Patented June 13, 1950

2,511,518

UNITED STATES PATENT OFFICE 2,511,518

FLUID SHAFT COUPLING

William T. Stephens, Painesville, Ohio

Application November 28, 1945, Serial No. 631,293

9 Claims. (Cl. 192—105)

My invention relates to fluid couplings and has for its principal object the provision of improved methods and apparatus for coupling rotating devices.

It is an object of my invention to provide a coupling which is precise, uniform and reliable in operation and which may be manufactured easily and inexpensively and which requires only relatively simple machining processes for manufacture.

A further object of my invention is to provide clutches or couplings in which the action may be produced automatically, or in which the torque transmitted may be limited to a predetermined value, or in which the engaging action may be delayed.

It is a further object of my invention to provide overload release couplings and gradually engaging or delayed action couplings.

Other and further objects, features and advantages of my invention will become apparent as the description proceeds.

In carrying out the invention in accordance with a preferred form thereof for coupling two relatively rotatable members, the members are arranged one member within the other. A noncircular or varying-radius track is provided in one member, and the other member is provided with radial cavities or bores containing plungers which ride on the track so as to move in and out radially. The cavities are filled with a fluid such as oil, for example, so that the plungers are forced in and out radially by relative rotation of the members, and there is a tendency for the fluid to be pumped back and forth through a passageway provided therefor. Means are provided for closing the passageway to couple the members.

A better understanding of the invention will be afforded by the following detailed description considered in conjunction with the accompanying drawing in which Fig. 1 is a longitudinal sectional view of a fluid coupling forming an embodiment of my invention having an axially movable check valve member. Fig. 2 is a view of a cross-section of the coupling of Fig. 1 represented as cut by a plane 2—2 indicated in Fig. 1. Fig. 3 is a longitudinal sectional view of a fluid coupling of the type illustrated in Fig. 1 having a cylindrical type of rolling member for riding in the track to increase the loading of which the coupling is capable. Fig. 4 is a longitudinal sectional view of a coupling similar to that shown in Fig. 1 but provided with a plurality of axially spaced tracks instead of only one. Fig. 5 is a view of a section of the coupling of Fig. 4 represented as cut by a plane 5—5. Fig. 6 is a fragmentary longitudinal sectional view corresponding to Fig. 4 representing a coupling in which means are provided for unloading the coupling when a predetermined torque is reached by providing overtorque slippage.

Fig. 7 is a longitudinal sectional view of a fluid coupling of the type illustrated in Figs. 4 and 5 in which rolling members in the form of spheres are employed both to ride in the track and to serve as fluid pumping plungers. Fig. 8 is a view of a cross-section of the coupling of Fig. 7 represented as cut by a plane 8—8. Fig. 9 is a longitudinal sectional view of a fluid coupling employing a radially movable check member. Fig. 10 is a view of a cross-section of the fluid coupling of Fig. 9 represented as cut by a plane 10—10. Fig. 11 is a cross-sectional view corresponding to Fig. 10 representing a fluid coupling in which a plunger is provided separate from the rolling member engaging the varying radius track. Fig. 12 is a longitudinal sectional view of a fluid coupling constructed so as to have delayed action, and Fig. 13 is a view of a cross-section of the delayed action coupling of Fig. 12 represented as cut by a plane 13—13.

Like reference characters are utilized throughout the drawing to designate like parts.

The coupling illustrated in Figs. 1 and 2 comprises an outer or shell member 11 enclosing an inner or core member 12, the two members being relatively rotatable. Either member may be the driving member or the driven member. For example, the core member 12 may be secured to a shaft 13 by a set screw 14, and the shaft may be the shaft of a motor, not shown, the outer member serving as a pulley for a flat belt.

The outer member 11 comprises a ring or shell 15 to which end plates 16 and 17 are secured by suitable means such as round-head screws 20. Conventional O-ring seals 18 and 19 are provided for preventing leakage between the inner and outer members so that a fluid-containing enclosure is formed in which the inner member 12 is contained. A noncircular track 21 is formed in the inner surface of the ring or shell 15. As illustrated in Fig. 2, the track 21 is formed with variations in radius recurring three times in the periphery of the track 21, that is the points of maximum radius and the points of minimum radius are 120 degrees apart. However, the invention is not limited to a specific number of points of maximum or minimum radius.

A diametrically extending opening 22 is formed in the core member 12 to receive a pair of cylindrical plungers 23 and 24. Preferably friction-reducing rolling members such as hardened steel spheres 25 and 26 are interposed between the plungers 23 and 24 and the track surface 21, so that the spheres 25 and 26 ride in the track 21. Means are provided for closing the opening between the plungers 23 and 24, except for a relatively small passageway. A suitable fluid such as oil is contained in the space enclosed within the outer or shell member 11 and including the opening 22 in the core member 12 and connecting passages, so that if the members were permitted to rotate relatively to each other, there would be a tendency for oil to surge back and forth through the passageway as a result of the plungers 23 and 24 being moved in and out. Oil outside of the plungers circulates freely through clearance between core 12 and shell 11.

In order to provide a suitable passageway between the plungers 23 and 24, the core member 12 is provided with an axially extending opening 27, intersecting the diametrical opening 22, and a plug member 28 is fitted in the axial opening 27. The plug member 28 is formed to receive coaxially therein an inner plug member 29. The plug members 28 and 29 are formed to provide an internal chamber or cavity 31 communicating through separate passageways with the two ends of the diametrical opening 22, and a ball check member 32 is provided in the cavity 31.

The plug member 28 is cylindrical with an outside diameter corresponding to the internal diameter of the opening 27 in the core member 12 and has two lengthwise grooves or flats 33 and 34 forming passageways, each communicating with one end of the diametrical opening 22. A right angle passageway 35 is formed in the member 28 to connect the passageway 33 with the internal chamber 31. In the construction illustrated in Fig. 1 the plug member 28 has an internal bore forming a continuation of the right hand half of the internal cavity 31 for receiving the second plug member 29.

The plug member 29 is provided with an axial opening 36 communicating with the internal chamber 31. An annular groove 37 is formed around the plug member 29, thereby leaving a neck portion 38. Crosswise openings 39 and 41 are cut radially in the neck portion 38 and the cylindrical wall portion of the plug members 28 and 29, respectively.

The plug member 29 may be provided with a conventional screw head 42 and a threaded portion 43 engaging a corresponding internal thread in the plug member 28 whereby the plug member 29 is secured within the plug member 28. Preferably an O-ring seal 44 is provided for sealing the joint between the outer surface of the plug member 29 and the inner surface of the bore in the plug member 28. The O-ring seals 18, 19 and 44 employ sealing rings composed of oil-resisting resilient compounds such as a suitable synthetic rubber. Preferably, however, an expanding type seal is provided for securing the plug member 28 within the bore 27 of the core member 12. This expanding seal may comprise a suitable annular groove 45 in the member 28 containing a ring 46 of oil-absorbent natural rubber material such that when oil comes in contact with it, it expands and tightly secures the plug member 28 in the bore 27 in the manner described in further detail in my copending application Serial No. 606,866 filed July 24, 1945, relating to a Cylinder assembly construction.

If relative rotation of the members 11 and 12 is caused to take place, the spheres 25 and 26 are caused to ride in the track 21 and, therefore, are forced to move in and out radially. In the particular construction shown, they ride in and out radially three times for each rotation of one member relative to the other. The plungers 23 and 24 are likewise forced in and out, thus causing pumping action of the oil or other fluid contained within the opening 22 and in the chamber 31.

The arrangement is such that the plungers 23 and 24 are moved in and out alternately, that is, one is in the innermost position when the other is in the outermost position. Consequently the oil or other fluid is pumped back and forth from one end to the other of the opening 22. As the plunger 23, for example, travels inward, oil is forced from the inner face of the plunger 23 through the space 33, the passageway 35, the internal chamber 31, the passageway 36, the crosswise opening 39 into the annular groove 37 and out through the radial opening 41 into the space 34 and into the portion of the opening 22 at the inner face of the plunger 24. When the plunger 24 moves inward, the oil tends to flow in the opposite direction. As soon as the motor shaft 13, for example, picks up sufficient speed, the flow of oil through the internal passageway 31 is such that it moves the ball check 32 against one or the other of two seats 47 and 48 formed at the junction of the passageway 36 and 35 with the internal chamber 31. As soon as one of the valve seats is closed by the ball check 32, a steady flow of oil in such a direction is prevented and, consequently, whichever plunger is moving inward is prevented from moving further, and the outer member 11 is locked upon the inner member 12. The size and arrangement of the fluid passageways and the size and weight of the ball check 32 determine the speed required and the rate of oil flow required for causing the check valve to close and bring about a coupling action. In the case of an electric motor drive, this action permits the motor shaft 18 to start turning before positive engagement between the coupling parts 11 and 12 takes place.

It will be observed that the abutment of the large diameter of the cone of plug 29 with the large diameter of the cone shape inside of plug 28 form a V-shaped longitudinal cross-section in which, due to centrifugal action, the ball 32 rests. The velocity of the fluid passing over the ball in either direction must be built up by the speed of the rotor, hence by the amount of fluid pumped, until it overcomes the centrifugal force, forcing the ball out of the V-groove up against the seat on one side or the other. A fixed delayed action is thereby accomplished.

In the arrangement of Figs. 1 and 2 the rolling elements 25 and 26, communicating the radius variations of the track 21 to the plungers 24 and 23, are in the form of spheres. However, my invention is not limited thereto. For example, as illustrated in Fig. 3, circular cylinders 50 may be employed as the rolling elements, and the track in the member 15 is formed accordingly so that the cylinders will roll therein, thereby providing a relatively large rolling surface and permitting a relatively heavy load to be carried. Corresponding parts of modified construction in embodiments of Figs. 1 and 3 are represented by like reference numerals, those in Fig. 3 being primed. In order that the plungers 23' and 24' of Fig. 3 may produce pumping action on the outward strokes as well as the inward strokes and fluid pressure produced by the inwardly moving piston need not be depended upon for moving the other piston outward, the plungers 23' and 24' are made in a form of cups containing springs 60, each of sufficient strength to balance the weight of the plunger and the roller 50.

The closed end cap 16' is provided to obviate necessity for the seal 18 shown in Fig. 1. In this case the plug member 29' is held in the plug member 28' and in the member 12' by means of a sheet metal guard or cover 49, secured by means of screws to the inner end face of the core member 12'. In the arrangement of Fig. 3, the end plate 17 of Fig. 1 has been replaced by an annular block 17' in which an annular groove 51 has been formed to serve as a pulley sheave. Preferably the groove 51 is of V or tapered cross-section so as to receive a V belt 52.

Between the pulley 17' and the neck portion 53 of the coupling core member 12', a bushing 54 is interposed and suitable sealing members 55 are provided at either end of the bushing member 54 to prevent leakage of oil or other fluid from the openings in the member 12'.

In connection with Figs. 1, 2 and 3, an arrangement has been shown in which two plungers travel in the same diametrical line and move alternately inward and outward. However, my invention is not limited to this arrangement. If desired, two such plungers may move inward and outward simultaneously. This is illustrated in Figs. 4 and 5, which also illustrate an arrangement in which two different tracks 56 and 57 are employed, in which rolling members are adapted to ride. The two tracks 56 and 57 are spaced apart axially in a ring portion 58 of the outer member 11. As illustrated in Fig. 5, the track 57 has two greater diameter and two lesser diameter points around its periphery. But the invention is not limited to this number of variations in radius. In the embodiment of Fig. 2 the track should be symmetrical, that is have an even number of points of greater and lesser radius, in order that two plungers 59 may move simultaneously.

An inner core member 61 is provided in which the diametrical opening 22 is displaced 90 degrees from the second diametrically extending opening 62 so that one set of plungers 59 travels inward when the other set of plungers 63 (shown by hidden lines) travels outward. In the arrangement of Figs. 4 and 5, the outer plug member 64 is fitted in the bore 27 having two annular grooves 65 and 66 cooperating with the diametrical openings 22 and 62 respectively. An inner plug member 67 is also provided which is threaded into the outer plug member 64. A right angular passageway 68 is provided having a radial arm communicating with the annular groove 66 and an axial arm communicating with the internal chamber 31 containing the ball check 32. As in the arrangement of Figs. 1, 2 and 3, a cross-passageway 41 is cut in the portion of the plug 64 between the groove 65 and the annular groove 37 of the inner plug member 67. Likewise, the inner plug member 67 has a cross-passageway 39 between the annular groove 37 and the bore 36 communicating with the internal chamber 31. The plug member 67 is provided with O-ring seals 44 and 69 on either side of the annular groove 37 and the outer plug member 64 is provided with sealing rings 71 on either side of the grooves 65 and 66 and between the grooves 65 and 66. Preferably the sealing rings 71 are of the expanding type as described in connection with the sealing ring 46 of Fig. 1, for tightly securing the plug member 64 in the bore 27.

In the arrangement of Figs. 4 and 5, as the plungers 59 are forced inward, the oil flows in through the opening 41, the annular groove 37, the opening 39, the bore 36 and into the chamber 31.

The valve check 32 is accordingly picked up and moved against the seat 48 so as to close the passageway and cause engagement of the fluid coupling. If the opposite plungers 63 are being moved inward, oil flows inward through the annular groove 66, the right angle passageway 68, and into the cavity 31. This causes the valve check to strike the seat 47, thus producing engagement of the coupling. In arrangement of Fig. 4, the plug member 67 is shown as having the portion containing the passageways formed integral with the threaded portion. However, the invention is not limited to this construction, and if desired, the inner end of the plug member 67 may be made axially slidable and spring biased in order to provide over-load relief. For example, as illustrated in Fig. 6, a radially movable plug member 72 is provided. There is a screw cap 73 and a spring 74 interposed between inner end of the cap 73 and the plug member 72 for elastically biasing the plug member 72 to an inward position in which the internal cavity 31 for the valve check 32 has the minimum volume. Engagement of the coupling members 11 and 61 takes place in the same manner as described in connection with Figs. 4 and 5. In the event that the torque transmitted should exceed a predetermined value, the fluid pressure, produced by the tendency of the plungers to move inward in response to the force exerted by the driving member, reaches such a value as to overcome the biasing effect of the spring 44 and to increase the volume of the internal chamber 31. The dimensions are so chosen that when the spring 44 is compressed, the volume of the internal chamber 31 is increased sufficiently to permit the spheres 25 and 26 to ride over the minimum radius portion of the track 56 or 57 as the case may be. This action will be obtained when either pair of plungers tends to be moved inward by the transmitted force, because when the ball check 32 is resting against the seat 47 the pressure acting thereon presses the spring 44. If the oil flow is in the opposite direction, the pressure nevertheless reacts upon the member 72 and presses the member 72 against the spring 74.

It has been pointed out, in connection with Figs. 1 and 2, that the abutment of the large diameter of the cone of plug 29 with the large diameter of the cone shape inside of plug 28 forms a V-shaped longitudinal section in which, due to centrifugal action, the ball 32 rests. It has also been pointed out that the velocity of the fluid passing over the ball in either direction must be built up by the speed of the rotor, hence by the amount of fluid pumped, until it overcomes the centrifugal force, forcing the ball out of the V-groove up against the seat on one side or the other. It will be observed in Fig. 4 that this same reaction occurs, except that Fig. 4 shows a readily adjustable means whereby a space can be provided between the large portion of the cones of plug 64 and the threaded adjustable plug 67. In this manner the angular V-groove created by these cones can be deepened by enlarging the space between the cones and thus permitting more space about the ball and increasing the amount of velocity required to move the ball axially to its seat, thus varying the degree of delayed action. It will be observed in Fig. 6 that the same reaction occurs. The sealed member 72 is abutted against the part having the seat 45 or integral therewith, and a spring of fixed length is inserted between the adjustable screw 73 and the abutted part 72. In this manner, a basic adjustment can be made as to the depth of the angular groove between the conical shapes of 47 and 48, which predetermines the delayed action portion of the coupling, and the spring 74, which is imposed between 73 and 72, is of sufficient strength that the area of the plug 47, when exposed to the pressure created from the pistons when the ball is seated, would permit the normal functioning of the coupling under a predetermined hydraulic pressure. Whenever the torque requirement is greater than normal, the pressure created by the pistons would react by depressing part number 47 axially in its chamber, by compressing spring 74 and creating a space between plugs 47 and 48 to receive pumped fluid, thus permitting the outer member of the coupling to rotate or slip as the piston or ball was forced inward.

Figs. 7 and 8 illustrate an arrangement in which, in effect, the outer plug member 28 of the previous figures is made integral with the core member 76. A plug member 77 is fitted into a bore 78 in the inner or core member 76. In the arrangement of Figs. 7 and 8, the load capacity is increased by increasing the number of plungers, and the simplicity of the construction is increased by employing rolling members or spheres which serve also as plungers. Thus, as shown in Fig. 8, the core member 76 is provided with a plurality, in which case, three radial openings 79 cooperating with a track 82 and similar radial openings 83 cooperating with a track 84. The radial openings 79 and 83 are displaced angularly, and the points of maximum radius are placed in the same angular position in the tracks 82 and 84 so that as the rolling members or spheres 85 move in and out in the openings 79 and 83 oil or other fluid passes back and forth axially through the internal chamber 31 containing the ball check 32. The internal or core member 76 is provided with an axial passageway 86 and three radial passageways 87 for connecting the radial openings 79 with the internal chamber 31. As in the arrangement of Figs. 1 to 5, the plug member 77 is provided with an axial passageway 36, an annular groove 37, and a crosswise opening 39 for allowing fluid to pass back and forth through the openings 83 into the internal chamber 31. Each of the radial openings 83 is provided with a radial passageway 89 communicating with the portion of the bore 78 around the annular groove 37 of the plug member 77.

The fluid couplings illustrated may be manufactured easily and quickly, with relatively simple machinery, and with close tolerances and a high degree of precision so as to obtain a uniformly reliable action, owing to the fact that the construction is such that simple operations are involved. For example, as shown in Figs. 1 to 6, a uniform circular bore 27 is provided in the member 12. There are no irregular internal surfaces to be machined where accuracy is required. The bores for the plungers 23 or 59 and the plug 28 are uniform throughout and pass straight through, diametrically or axially and may readily be honed. The plug members 28 and 29 are so constructed so that the surfaces can readily be turned on a lathe or cut with a drill so that no complicated operations are involved.

The formation of a track for the rolling elements is a relatively simple operation and does not require the high degree of accuracy which is required in the case of the bores for the oil sealing plungers.

In the arrangement of Figs. 7 and 8, the openings for the plungers are not extended through diametrically, but no undercut surfaces are involved and no machining is required on hidden surfaces which are not exposed to the outside for operation by ordinary machine tools.

In the arrangement of Figs. 9 and 10, a core member or inner member 91 is provided having a plurality of radial plunger receiving openings, for example, four radial openings 92 of sufficient diameter to receive members 93, which serve both as oil pumping plungers and rolling members engaging a noncircular track 94 in the outer member 11. To avoid the need for a separate member for check valve action, the radial openings 92 are formed with reduced diameter portions 95, which are in turn reduced in diameter in order to form seats 96 against which ball checks 97 sliding loosely in the openings 95 may be driven by the flow of fluid upon the inward motion of the spheres 93. An inner well or reservoir 98 is provided to communicate with the bores 92 and 95 through radial apertures 99.

In the arrangements of Figs. 9 and 10, the plungers 93 are thrown outward by centrifugal force when the member 91 rotates and the ball checks 97 are also lifted from their seats by centrifugal force. Centrifugal force also serves to throw oil or other fluid from the reservoir 98 to the openings 92. Then as the spheres 93 are forced inward when engaging the shorter radius portions of the track 94, the oil or other fluid is caused to flow back through the seats 96, seating the valve checks 97 and preventing the further flow of oil so as to prevent further inward movement of the spheres 93 and thus locking the relatively movable members.

In order to minimize leakage of fluid around the spherical plungers 93 and thus minimize the possibility of slippage between the relatively rotatable members 11 and 91, separate cylindrical plungers 101 may be provided as shown in Fig. 11 which are interposed between the spherical rolling members 93 and the ball checks 97.

In the arrangement of Figs. 9 to 11 the number of radial openings has been made equal to the number of maximum radius portions of the track 95 so that all of the plungers 93 or 101 move in or out simultaneously. However, the invention is not limited to this arrangement since, as illustrated in the other figures, the plungers may be caused to move in alternately or at different times so as to pump fluid back and forth through different openings by making the number of plungers operating with one track different from the number of maximum radius portions in the track.

Where delayed action is desired, this may be accomplished by providing a slow acting check valve as illustrated in Figs. 12 and 13. In this case, an outer or enclosing member 102 is provided which cooperates with an inner or core member 103 having a plurality of radial openings 104 receiving spherical plungers 105 serving both as plungers and as rolling members riding in a non-circular track 94 in the enclosing member 102. The member 102 is closed at one end and sealed to the neck portion 53 of the core member 103 by an end plate 17 and a conventional seal 55. The core member 103 is provided with a bore 107 running axially thereof receiving a plug 108 sealed in the bore by a conventional O-ring seal and prevented from sliding out of the bore by a screw cap 73 engaging threads 109 in the member 53.

The plug 108 has a central bore 111 receiving an enlarged shank or stem 112 carrying a check valve cone 113 adapted to cooperate with a seat 114 around the bore 111. There is a reduced diameter neck 115 between the valve 113 and the stem 112. The screw cap 73 has a cavity 116 receiving a spring 117 for normally lifting the check valve cone 113 from its seat 114. A passageway is provided from the chamber 107 through the plug bore 111 to the outside portion of the space within the track 94 of the member 102. For this purpose there are radial notches 118 in the screw cap 73 or the member 108 at the contacting surface, an annular groove 119, and a radial opening 121 in the member 103. Space 122 is provided along the surface of the core member 103 to permit passage of oil between the surfaces of the members 103 and 17.

As relative rotation between the members 53 and 102 first takes place if the relative rotation is very slow the check valve 113 remains open as a result of being lifted from its seat 114 by the spring 117. However, as the oil flow increases, the resistance resulting from the small clearance between the large diameter stem 112 and the surface of the bore 111 in the plug 108 causes movement of stem 112 against the force of the spring 117, thus causing the check valve to seat. Upon seating of the check valve 113, it is held closed by oil pressure exerted against it.

Preferably a relief valve is provided to prevent excessive torques from being transmitted. This may take the form of an axial passageway 123 in the member 103 communicating with crosswise passageways 124, the passageway 123 being normally closed by means of a ball check 125 held against a seat 126 around the end of the passageway 123 by a spring 127. In case the coupling should be overloaded, the ball check 125 is lifted from its seat 126, and the oil trapped in the oil chamber 107 is permitted to flow out through the passageway 124 to the space between the members 103 and 102. This permits the plungers 105 to move inward and permits relative rotation to take place between the members 102 and 103.

I have herein shown and particularly described certain embodiments of my invention and certain methods of operation embraced therein for the purpose of explaining its principle of operation and showing its application, but it will be obvious to those skilled in the art that many modifications and variations are possible and I aim, therefore, to cover all such modifications and variations as fall within the scope of my invention which is defined in the appended claims.

What I claim is:

1. A fluid coupling comprising in combination first and second relatively rotatable members, the first of said members having a varying-radius track therein and the second of said members having a pair of radial openings with plunger means therein adapted to be moved in and out radially by variations in radius of said track, means associated with said plunger means for engaging said track, said second member having a fluid-containing passageway therein joining said radial openings whereby relative rotation of said members and radial movement of said plunger means tend to cause movement back and forth through said passageway, of fluid therein, a portion of said passageway extending axially and being radially enlarged with a check member therein, whereby centrifugal force urges said check valve to said enlarged passageway portion but flow of fluid through the enlarged portion of said passageway in consequence of relative rotation of said members tends to press said check member in one direction or the other axially for impeding the flow of fluid and coupling one member to the other.

2. Apparatus as in claim 1 wherein a movable member is provided for varying the size of the enlarged portion of the said passageway and a plunger and a biasing spring are provided for normally maintaining said enlarged portion at minimum volume whereby a predetermined torque is required for expanding said volume sufficiently to receive fluid expelled from said openings by said plungers and preventing coupling of the members.

3. Apparatus as in claim 1 wherein cylindrical pistons are mounted in said radial openings and rolling members are interposed between said pistons and said tracks for transmitting variations in radius of said track to said pistons.

4. Apparatus as in claim 1 wherein cylindrical pistons are mounted in said radial opening and spheres are interposed between said pistons and said tracks for transmitting variation in radius of said tracks to said pistons.

5. A fluid coupling comprising in combination a pair of relatively rotatable members fitting one within the other, the outer member having a varying-radius inner track, the inner member having a plurality of openings extending radially including portions of two different diameters and a port, the greater diameter portions being at the outer ends of said openings, a center well communicating with said port and said openings, fluid contained in said well and openings, plungers movable in the greater diameter portions of said openings adapted to ride on said tracks, and check valve members in the smaller diameter portions of said openings between the track riding plunger and said ports for impeding flow of fluid from the greater diameter portion of the opening through ports in response to inward motion of the plungers caused by relative rotation of said inner and outer members.

6. An over-torque release fluid coupling comprising in combination first and second relatively rotatable members, the first of said members having a non-uniform track therein, the second of said members having circumferentially spaced openings therein with plunger means adapted to be moved in and out of said openings by variations in said track as relative rotation takes place between said members, said second member having a fluid containing passageway communicating with said plunger means receiving openings whereby relative rotation of said members tends to cause movement back and forth through said passageway of fluid therein, a portion of said passageway being radially enlarged in comparison with adjacent portions and having valve-seats formed at the axial margins of the enlarged portion with a check member therein, whereby flow of fluid through the enlarged portion of said passageway in consequence of relative rotation of said members tends to press the check member axially against one of said seats for impeding the flow of fluid and coupling one member to the other, and means for varying the size of the enlarged portion of said passageway, comprising a movable member with a biasing spring for normally maintaining said enlarged portion at minimum volume whereby a predetermined torque is required for expanding said volume sufficiently to receive fluid expelled from said openings by said plunger means and preventing or releasing coupling of the members.

7. A fluid coupling comprising in combination a pair of relatively rotatable members, one of said members having a track therein having portions eccentric to the axis of rotation of said members, the second of said members having a plurality of radial openings therein and plungers movable in said openings adapted to engage said track whereby said plungers move in and out radially when relative rotation takes place between said members, said second member being formed with fluid passageway means establishing communication between said plunger receiving openings, fluid in said openings and passageway means, said passageway means being formed with valve seat means, and check valve means loosely disposed in said passageway means, said passageway means having a radial enlargement spaced from said valve seat means to receive said check valve means under the action of centrifugal force when relative rotation of said members begins, with which said check valve means clear said valve seat means, said check valve means being free to move with fluid pumped by said plungers to engage said seat means and close said passageway means at a rate of relative rotation of said members such that the action of the pumped fluid on said valve means overcomes the centrifugal force acting thereon.

8. A fluid coupling comprising in combination a pair of relatively rotatable members, one of said members having a track therein having portions eccentric to the axis of rotation of said members, the second of said members having a plurality of radial openings therein and plungers movable in said openings adapted to engage said track whereby said plungers move in and out radially when relative rotation takes place between said members, said second member being formed with fluid passageway means establishing communication between said plunger receiving openings, fluid in said openings and passageway means, said passageway means having an intermediate chamber having an axial extent and being formed with valve seats at each end thereof, a mid-portion of said chamber being of maximum diameter, and a check valve in said chamber, said check valve being urged to and held in said maximum diameter chamber section by centrifugal force when relative rotation of said members begins, with which said check valve clears said valve seats, said check valve being free to move with fluid pumped by said plungers to alternately engage said valve seats and close said passageway means at a rate of relative rotation of said members such that the action of the pumped fluid on said check valve overcomes the centrifugal force acting thereon.

9. A fluid coupling comprising in combination first and second relatively rotatable members, the first of said members surrounding the second and having a pair of axially-spaced varying-radius tracks therein, the second of said members having two sets of radial openings one set being axially aligned with each track, plunger means in said openings adapted to be moved in and out radially by variations in radius of the associated tracks, said tracks and sets of radial openings being arranged so that their actions are out of phase, said second member having a fluid-containing passageway therein joining said sets of radial openings whereby relative rotation of said members and radial movement of said plunger means tend to cause movement back and forth through said passageway of fluid therein, a portion of said passageway extending axially and being radially enlarged with a check valve member therein, whereby centrifugal force urges said check valve member to said radially enlarged passageway portion but flow of fluid axially through the enlarged portion of said passageway in consequence of relative rotation of said members tends to press said check member in one direction or the other axially for impeding the flow of fluid and coupling one member to the other.

WILLIAM T. STEPHENS.

REFERENCES CITED

The following references are of record in the file of this patent:

UNITED STATES PATENTS

| Number | Name | Date |
|---|---|---|
| 809,331 | De Simone | Jan. 9, 1906 |
| 1,840,161 | Graser | Jan. 5, 1932 |
| 2,172,975 | Hutsing | Sept. 12, 1939 |

FOREIGN PATENTS

| Number | Country | Date |
|---|---|---|
| 342,598 | Great Britain | Feb. 5, 1931 |